July 15, 1952
C. A. CRAIG
2,603,022
ARTIFICIAL BAIT FOR FISH LURES
Filed Nov. 21, 1949
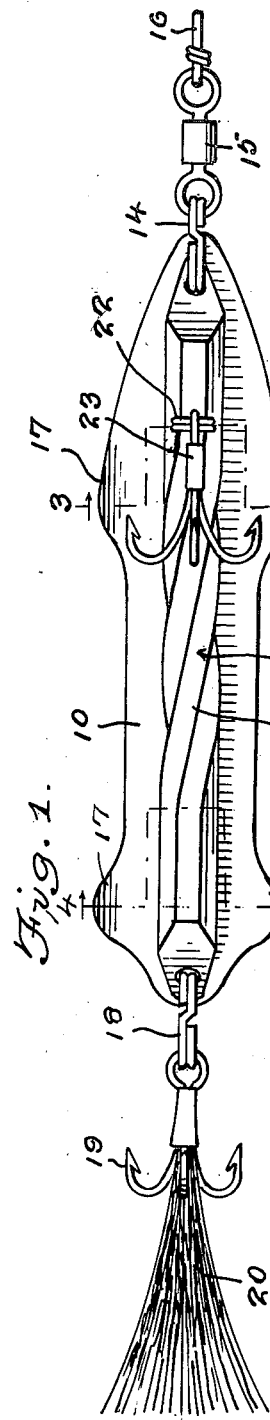
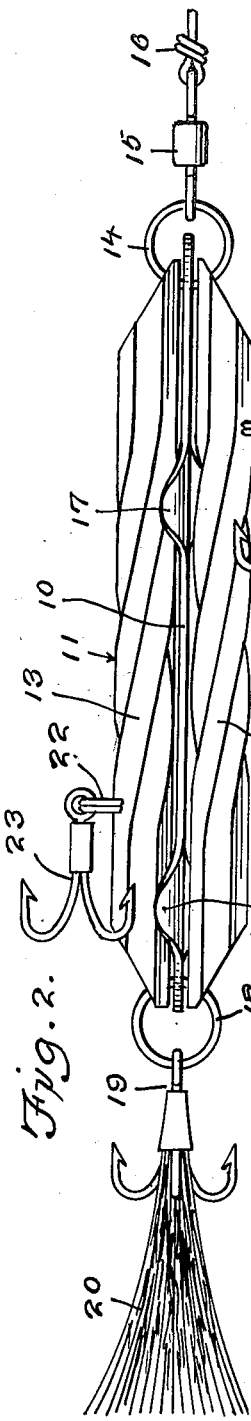
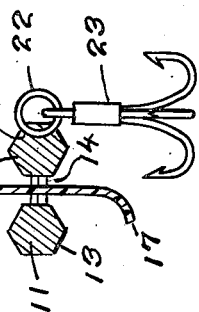
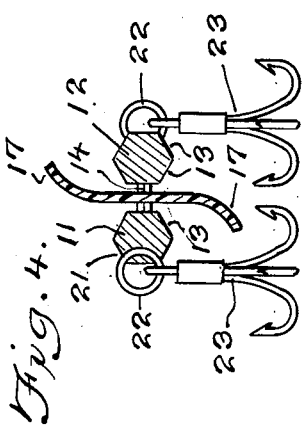
INVENTOR.
Charles A. Craig
BY Victor J. Evans & Co.
ATTORNEYS Patented July 15, 1952

2,603,022

UNITED STATES PATENT OFFICE 2,603,022

ARTIFICIAL BAIT FOR FISH LURES

Charles A. Craig, Santa Barbara, Calif.

Application November 21, 1949, Serial No. 128,574

4 Claims. (Cl. 43—42.11)

This invention relates to an artificial bait for fish lures.

The object of the invention is to provide a fish lure which will simulate the appearance of live bait as it is drawn through the water to thereby attract fish.

Another object of the invention is to provide a fish lure which will revolve as it is drawn through the water, the lure carrying a plurality of fishhooks which are spaced from each other to prevent any entanglement therebetween, the lure including a multi-colored plastic fin arranged between a pair of twisted body members which each has a plurality of facets for reflecting colors from the plastic fin so that the entire lure will resemble a fish as it is pulled through the water.

Another object of the invention is to provide a fish lure which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the fish lure constructed according to the present invention;

Figure 2 is a top plan view of the fish lure of the present invention;

Figure 3 is a sectional view taken on the line 3—3 of Figure 1, and with the front fishhook hanging from the corresponding body member;

Figure 4 is a sectional view taken on the line 4—4 of Figure 1.

Referring in detail to the drawings, there is shown a fish lure which comprises an elongated, relatively-flat fin 10 that is preferably fabricated of a suitable plastic material, the fin 10 being multi-colored. The fin 10 is interposed in the space between a pair of spaced parallel body members 11 and 12. The fin 10 is of greater width than the body members 11 and 12 and the fin 10 is interposed between the body members so that the transverse axis of the fin is at a right angle to the longitudinal center line of the body members, it also being noted that the fin and body members are of the same approximate length. The body members 11 and 12 are preferably fabricated of metal of the type which will not rust, and the body members 11 and 12 may have a hexagonal cross-section. Each of the body members 11 and 12 is provided with an intermediate twisted portion, and there are a plurality of facets or faces 13 on each of the body members 11 and 12 for reflecting the colors from the fin 10, so that the entire lure will have the appearance of a live fish as it is drawn through the water.

A first split ring 14 connects the front ends of the body members 11 and 12, and the front end of the fin together, whereby these parts will be maintained in assembled relation. A swivel member 15 connects the first split ring 14 to an end of a fishing line 16, and when the fishing line 16 is drawn or pulled through the water, the swivel connection 15 will enable the fin 10 and body members 11 and 12 to revolve or rotate.

The fin 10 is provided with a plurality of spaced arcuate or curved portions or wings 17. These curved portions 17 impart a rotary movement to the fin 10 and body members 11 and 12 as the fish lure is drawn through the water.

For connecting the rear ends of the body members 11 and 12 and the fin 10 together, a second split ring 18 is provided. The split ring 18 also carries a fishhook 19 which may have feathers 20 or other suitable camouflage arranged thereover, Figures 1 and 2.

Each of the body members 11 and 12 is provided with an opening 21 and a small split ring 22 is arranged in engagement with each of the openings 21. The split ring 22 serves to support a fishhook 23 thereon. The fishhook 19 and the pair of fishhooks 23 are so spaced or arranged so that entanglement therebetween will be prevented when the fish lure is being used.

From the foregoing, it is apparent that a fish lure has been provided which, when drawn through the water, will simulate live bait. The fish lure of the present invention includes a multi-colored plastic fin 10 that has the curved wings 17 arranged thereon, so that as the lure is pulled through the water by the fishing line 16, the lure will rotate or revolve. Further, the body members 11 and 12 are arranged on opposite sides of the fin 10 and the facets 13 of the body members 11 and 12 will serve to reflect the multi-colors from the fin 10, whereby the lure will have the appearance of a live fish. Also, the split rings 14, 18 and 22 can be readily removed from the lure, whereby the various parts of the fish lure can be detached and arranged as desired.

The body members 11 and 12 may be fabricated of any suitable material, such as brass or chromium-plated metal, and the plastic fin may be colored in any desired manner. The lure can be used for casting, trolling or any other type of fishing. The body members 11 and 12 may also be of any desired color. The lure of the present invention can be manufactured without requiring complicated or expensive machinery. Also, the various parts of the fish lure of the present invention will not rust when placed in salt water.

What is claimed is:

1. In a fish lure, a pair of spaced parallel body members having straight outer end portions and intermediate twisted portions, an elongated fin interposed between said body members with the transverse axis of the fin at a right angle to the longitudinal center line of the body members, a first split ring connecting the front ends of said body members and fin together and adapted to be attached to a fishing line, a second split ring connecting the rear ends of said body members and fin together, and a fishhook carried by each of said body members at one end thereof with said hook members arranged at ends opposite to each other.

2. The apparatus as described in claim 1, and further including a fishhook carried by said second split ring, and camouflage arranged over said last-named hook, said lure revolving as it is pulled through the water.

3. The apparatus as described in claim 1, wherein the intermediate twisted portion of each of said body members is provided with a plurality of reflecting facets, and wherein said elongated fin is fabricated of plastic.

4. A fish lure comprising a pair of body members arranged in spaced parallel relation with respect to each other, a multi-colored elongated plastic fin interposed between said body members with the transverse axis of the fin at a right angle to the longitudinal center line of the body members, each of said body members being provided with a plurality of facets for reflecting the colors from said fin, said fin being provided with a plurality of arcuate portions thereon, a first split ring connecting the front ends of said body members and said fin together and adapted to be connected to a fishing line, a second split ring connecting the rear ends of said body members and said fin together, a fishhook carried by said second split ring, camouflage arranged over said last-named fishhook, there being openings arranged in said body members, and a fishhook arranged in engagement with the openings in said body members.

CHARLES A. CRAIG.

REFERENCES CITED

The following references are of record in the file of this patent:

UNITED STATES PATENTS

| Number | Name | Date |
| --- | --- | --- |
| 323,111 | Chapman | July 28, 1885 |
| 1,603,118 | Knill | Oct. 12, 1926 |
| 2,234,439 | Larson | Mar. 11, 1941 |
| 2,389,423 | Evans | Nov. 20, 1945 |
| 2,467,151 | Nordquist | Apr. 12, 1949 |

FOREIGN PATENTS

| Number | Country | Date |
| --- | --- | --- |
| 21,695 | Great Britain | 1893 |